US012043753B2

(12) United States Patent
Birkenheuer et al.

(10) Patent No.: US 12,043,753 B2
(45) Date of Patent: Jul. 23, 2024

(54) PROCESS FOR CORROSION-PROTECTING PRETREATMENT OF A METALLIC SURFACE CONTAINING STEEL, GALVANIZED STEEL, ALUMINUM, AN ALUMINUM ALLOY, MAGNESIUM AND/OR A ZINC-MAGNESIUM ALLOY

(71) Applicant: Chemetall GmbH, Frankfurt (DE)

(72) Inventors: Stefan Birkenheuer, Shanghai (DE); Dietmar Chmielewski, Romanshorn (CH); Carina Hecker, Frankfurt am Main (DE); Oliver Sauer, Frankfurt am Main (DE); Daniel Schatz, Frankfurt am Main (DE)

(73) Assignee: CHEMETALL GMBH, Frankfurt (DE)

( * ) Notice: Subject to any disclaimer, the term of this patent is extended or adjusted under 35 U.S.C. 154(b) by 364 days.

(21) Appl. No.: 16/332,858

(22) PCT Filed: Sep. 6, 2017

(86) PCT No.: PCT/EP2017/072316
§ 371 (c)(1),
(2) Date: Mar. 13, 2019

(87) PCT Pub. No.: WO2018/050506
PCT Pub. Date: Mar. 22, 2018

(65) Prior Publication Data
US 2019/0249030 A1 Aug. 15, 2019
US 2024/0043713 A9 Feb. 8, 2024

(30) Foreign Application Priority Data

Sep. 15, 2016 (DE) .......................... 102016217574.2

(51) Int. Cl.
C09D 133/12 (2006.01)
B05D 1/34 (2006.01)
B05D 1/36 (2006.01)
C09D 5/08 (2006.01)
C09D 7/61 (2018.01)
C09D 133/02 (2006.01)
C09D 161/04 (2006.01)
C09D 183/04 (2006.01)
C23C 22/34 (2006.01)
C23C 22/44 (2006.01)
C23C 22/78 (2006.01)
C23C 22/83 (2006.01)

(52) U.S. Cl.
CPC ............ C09D 133/02 (2013.01); B05D 1/34 (2013.01); B05D 1/36 (2013.01); C09D 5/08 (2013.01); C09D 5/084 (2013.01); C09D 7/61 (2018.01); C09D 161/04 (2013.01); C09D 183/04 (2013.01); C23C 22/34 (2013.01); C23C 22/44 (2013.01); C23C 22/78 (2013.01); C23C 22/83 (2013.01); B05D 2202/00 (2013.01); B05D 2202/10 (2013.01); B05D 2202/25 (2013.01); C23C 2222/20 (2013.01)

(58) Field of Classification Search
None
See application file for complete search history.

(56) References Cited

U.S. PATENT DOCUMENTS

| 3,625,899 | A | * | 12/1971 | Sawyer ............... C10M 145/28 252/75 |
| 5,080,718 | A | * | 1/1992 | Sullivan .............. B82Y 30/00 106/401 |
| 5,650,097 | A | * | 7/1997 | Wysong ............... C10M 129/40 252/392 |
| 6,071,435 | A | * | 6/2000 | Komiyama ........... C23C 22/30 106/14.12 |
| 2003/0213533 | A1 | * | 11/2003 | Sako ..................... C23C 22/34 148/243 |
| 2013/0178125 | A1 | * | 7/2013 | Jiang .................... C09D 5/1675 428/524 |
| 2013/0209830 | A1 | | 8/2013 | Suzuki et al. |

(Continued)

FOREIGN PATENT DOCUMENTS

| CN | 1105713 A | 7/1995 |
| CN | 101343740 A | 1/2009 |
| CN | 102787312 A | 11/2012 |

(Continued)

OTHER PUBLICATIONS

Lee et al., Polymers 2018, 9, 105.*
International Search Report issued in PCT/EP2017/072316, dated Dec. 7, 2017, 3 pages.
"High-Temperature Protective Coating", ed. He, et al., Feb. 2012, pp. 341-343. Cited in Office Action of corresponding CN Application No. 201780056502.8, appended with English translation.

Primary Examiner — James M Mellott
(74) Attorney, Agent, or Firm — Armstrong Teasdale LLP

(57) ABSTRACT

Described herein is an improved process for anticorrosion pretreatment of a metallic surface including steel, galvanized steel, aluminum, an aluminum alloy, magnesium and/or a zinc-magnesium alloy, wherein the metallic surface is brought into contact with i) an acidic aqueous composition A which includes a1) at least one compound selected from the group consisting of titanium, zirconium and hafnium compounds, and with ii) an aqueous composition B which includes b1) at least one (meth)acrylate resin and b2) at least one phenol resin, where the metallic surface is brought into contact firstly with the composition A and then with the composition B and/or firstly with the composition B and then with the composition A and/or simultaneously with the composition A and the composition B.

21 Claims, No Drawings

(56) References Cited

U.S. PATENT DOCUMENTS

2013/0280552 A1\* 10/2013 Bae .................. C22C 38/06
                                                      428/653
2014/0223740 A1\*  8/2014 Matsui .............. F28F 21/084
                                                      29/890.054

FOREIGN PATENT DOCUMENTS

| EP | 1426466 A1 | 6/2004 |
| EP | 1643009 A1 | 4/2006 |
| JP | 2007138264 A | 6/2007 |
| WO | 2011029680 A1 | 3/2011 |
| WO | 2016096777 A1 | 6/2016 |
| WO | 2017186931 A1 | 11/2017 |
| WO | 2017220632 A1 | 12/2017 |

\* cited by examiner

PROCESS FOR CORROSION-PROTECTING PRETREATMENT OF A METALLIC SURFACE CONTAINING STEEL, GALVANIZED STEEL, ALUMINUM, AN ALUMINUM ALLOY, MAGNESIUM AND/OR A ZINC-MAGNESIUM ALLOY

The present invention relates to an improved process for the anticorrosion pretreatment of a metallic surface comprising steel, galvanized steel, aluminum, an aluminum alloy, magnesium and/or a zinc-magnesium alloy. It further relates to a composition for improving the anticorrosion pretreatment of such a metallic surface, a concentrate for producing this composition, a correspondingly coated metallic surface and also the use of a correspondingly coated metallic substrate.

The coating of metallic surfaces with an aqueous composition comprising compounds of titanium, of zirconium and of hafnium, organoalkoxysilanes, hydrolysis and/or condensation products thereof and also further components is known.

Corrosion protection for the treated metal substrates can be achieved by means of the coatings formed, as can a certain improvement in the adhesion of further layers such as paints or varnishes.

The addition of particular acid-stable polymers to the abovementioned compositions is also disclosed in the prior art. The properties of the layers formed can be improved in this way.

However, problems in respect of corrosion delamination, which have hitherto not been able to be solved satisfactorily even by using the polymers mentioned, still occur, particularly in the case of surfaces comprising steel, galvanized steels, aluminum, an aluminum alloy, magnesium and/or a zinc-magnesium alloy.

It is therefore an object of the present invention to overcome the disadvantages of the prior art and provide an improved process for anticorrosion pretreatment for metallic surfaces comprising steel, galvanized steel, aluminum, an aluminum alloy, magnesium and/or a zinc-magnesium alloy, having the corrosion protection in particular on galvanized steels.

The object is achieved by a process according to claim 1, an aqueous composition according to claim 21, a concentrate according to claim 22, a metallic surface according to claim 23 and also the use of a metallic substrate according to claim 24.

In the process of the invention for the anticorrosion pretreatment of a metallic surface comprising steel, galvanized steel, aluminum, an aluminum alloy, magnesium and/or a zinc-magnesium alloy, the metallic surface is brought into contact with i) an acidic aqueous composition A which comprises a1) at least one compound selected from the group consisting of titanium, zirconium and hafnium compounds, and ii) an aqueous composition B which comprises b1) at least one (meth)acrylate resin and b2) at least one phenolic resin, where the metallic surface is brought into contact i) firstly with the composition A and then with the composition B, ii) firstly with the composition B and then with the composition A and/or iii) simultaneously with the composition A and the composition B.

Definitions

For the purposes of the present invention, an "aqueous composition" includes a composition which comprises not only water as solvent/dispersion medium but also less than 50% by weight, based on the total amount of the solvent/dispersion medium, of other, organic solvents/dispersion media.

For the purposes of the present invention, "calculated as hexafluorozirconic acid" refers to the fiction that all molecules of the component a1) in the composition A are hexafluorozirconic acid molecules, i.e. $H_2ZrF_6$.

"Complex fluorides" encompass not only the deprotonated forms but also the respective singly or multiply protonated forms.

For the purposes of the present invention, "(meth)acrylate resin" in component b1) refers to a copolymer which as monomer units comprises at least one acrylic ester and/or methacrylic ester.

The expression "the metallic surface is brought into contact i) firstly with the composition A and then with the composition B, ii) firstly with the composition B and then with the composition A and/or iii) simultaneously with the composition A and the composition B"

should be interpreted as meaning that the following embodiments are also encompassed:

The metallic surface is brought into contact in succession with a first composition B (prerinse), with a composition A and with a second composition B (afterrinse), with the first and second compositions B also being able to be chemically identical.

The metallic surface, before, after and/or between being brought into contact with the composition A and the composition B, is brought into contact with one or more further compositions—especially rinsing compositions—and/or is entirely or partially dried.

The expression "the metallic surface is brought into contact [ . . . ] simultaneously with the composition A and the composition B" should be interpreted as meaning that it can also be brought into contact with a single composition which is an aqueous composition comprising all components a1, b1) and b2) and also the optionally further components of the compositions A and B (see below).

i) Composition B:

According to one preferred embodiment, the metallic surface is brought into contact firstly with the composition A and then with the composition B, meaning that the composition B is used as an afterrinse.

Through the addition of the at least one (meth)acrylate resin b1) and of the at least one phenolic resin b2) to the composition B, in accordance with the invention, it is possible to achieve a marked improvement in the properties of the resultant coatings, especially the corrosion protection on galvanized steel.

Here, in the composition B, the (meth)acrylate resin b1) comprises not only at least one acrylic ester and/or methacrylic ester but also monomer units selected from the group consisting of (meth)acrylic acid, vinylphosphonic acid and vinylsulfonic acid, preferably (meth)acrylic acid.

"(Meth)acrylic acid" refers to acrylic acid and/or methacrylic acid and also to the respective deprotonated forms.

With particular preference the (meth)acrylate resin b1) is a copolymer of a methacrylic ester and of acrylic acid, especially preferably of methyl methacrylate and acrylic acid, said copolymer comprising preferably 80 to 98% by weight of methyl methacrylate and 2 to 20% by weight of acrylic acid (total: 100% by weight), more preferably 85 to 95% by weight of methyl methacrylate and 5 to 15% by weight of acrylic acid (total: 100% by weight).

The at least one (meth)acrylate resin b1) is preferably a random copolymer.

The at least one (meth)acrylate resin b1), moreover, preferably comprises additionally hydroxyl, silyl, alkyl, aryl, heteroalkyl, heteroaryl, thio, amino, amide, nitrile, epoxy, mercapto, ureido, nitro, halo and/or cyano groups, more preferably hydroxyl, silyl, alkyl, amino and/or epoxy groups.

With particular preference the at least one (meth)acrylate resin b1) additionally comprises hydroxyl and/or silyl groups. The additional groups are located preferably on the alcohol residues of the (meth)acrylate monomer units, and have the advantage of being able to form covalent bonds to the metallic surface and/or to the components of further coatings, more particularly of paints and varnishes.

The at least one (meth)acrylate resin b1) preferably has a mass-average molecular weight in the range from 1000 to 500 000 g/mol, more preferably from 3000 to 250 000 g/mol, particularly preferably in the range from 5000 to 20 000, more preferably from 8000 to 17 000 g/mol, and especially preferably from 10 000 to 15 000 g/mol.

The at least one phenol resin b2) in the composition B has been prepared preferably by acidic condensation of formaldehyde and phenol and preferably has a molar ratio of formaldehyde to phenol of less than 1:1 (novolac), and/or preferably has been prepared by basic condensation of formaldehyde and phenol and preferably comprises reactive methylol groups, with its benzene rings being joined to one another via methylene groups and also via ether bridges (resole).

With particular preference the at least one phenolic resin b2) is a resole.

The at least one phenol resin b2) preferably has a mass-average molecular weight in the range from 100 to 5000 g/mol, more preferably from 130 to 3000 g/mol, more preferably from 145 to 1000 g/mol, particularly preferably in the range from 160 to 600 g/mol and especially preferably from 190 to 300 g/mol.

According to a particularly preferred embodiment, the composition B comprises as b1) a copolymer of methyl methacrylate and acrylic acid with from 85 to 95% by weight of methyl methacrylate and from 5 to 15% by weight of acrylic acid (total: 100% by weight) and with a mass-average molecular weight in the range from 8000 to 17 000 g/mol, and also comprise as b2) a resole having a mass-average molecular weight in the range from 145 to 1000 g/mol.

The composition B comprises components b1) and b2) preferably in a weight ratio of from 1:1 to 10:1, more preferably of from 2:1 to 6:1 and particularly preferably in a weight ratio of from 3.1:1 to 4.6:1.

The concentration of b1) and b2) in total in the composition B is preferably in the range from 20 to 400 mg/l and particularly preferably in the range from 50 to 200 mg/l (calculated as solid addition).

The pH of the composition B is preferably in the range from 3 to 9, particularly preferably from 3 to 6 and especially preferably in the range from 4 to 5. A pH of from 4 to 5 is advantageous especially in those cases where the composition B comprises a conversion bath.

As has surprisingly been found, certain ionic species contained in the composition B may under certain circumstances destabilize the at least one (meth)acrylate resin b1) and the at least one phenol resin b2) in the composition B, and may lead to aggregation and precipitation of these components.

The composition B may advantageously comprise a stabilizer b3). This stabilizer, surprisingly, lowers the sensitivity of the composition B to the particular ionic species, and also enables operation over a broader pH range of the composition B.

Especially if the metallic surface is brought into contact with a single aqueous composition comprising all of components a1), b1) and b2), i.e. if the resin mixture b1)+b2) according to the invention is added to the conversion bath, a stabilizer of this kind is advantageous. Otherwise, within the acidic environment of the conversion bath—with a pH of 4.8, for example—the resin mixture tends towards aggregation, leading to the bath becoming unusable over time.

Said stabilizer b3) preferably comprises at least one triblock copolymer of the formula I:

$$PEOx\text{-}PPOy\text{-}PEOz \qquad (I),$$

where PEO is polyethylene oxide and PPO is polypropylene oxide, x and z in each case are an integer in the range from 4 to 12 and y is an integer in the range from 35 to 65.

Preferably x and z are in each case an integer in the range from 6 to 10 and y is an integer in the range from 40 to 60. More preferably x and z in each case are an integer in the range from 7 to 9 and y is an integer in the range from 45 to 55.

According to a particularly preferred embodiment, Pluronic® PE 9200 (BASF, Germany) is used as stabilizer b3). It comprises $PEO_8\text{—}PPO_{50}\text{-}PEO_8$.

The mass concentration (calculated as solid addition) of the stabilizer b3) in the composition B is preferably from 1.5 to 2.5 times, more preferably from 1.8 to 2.2 times, the total concentration of the (meth)acrylate resin b1) and of the phenol resin b2).

According to a preferred embodiment, the composition B further comprises at least one compound b4) of the formula II

$$R^1O\text{—}(CH_2)_x\text{—}Z\text{—}(CH_2)_y\text{—}OR^2 \qquad (II),$$

where $R^1$ and $R^2$ in each case independently of one another are H or a group $HO\text{—}(CH_2)_w\text{—}$ with $w \geq 2$, x and y in each case independently of one another are 1 to 4, and Z is a sulfur atom or a C—C triple bond.

The at least one compound b4) of the formula II acts in this case as a physical corrosion inhibitor, which is adsorbed on the metallic surface by means of dipole-dipole interactions and Van-der-Waals forces, and so prevents corrosive attack on the metal surface.

The at least one compound b4) is present preferably in a concentration in the range from 10 to 300 mg/l, particularly preferably from 50 to 180 mg/l (calculated as but-2-yne-1, 4-diol).

The addition of such corrosion inhibitor has proven advantageous especially where the composition B is employed as a prerinse.

According to a particularly preferred embodiment, the composition B comprises not only components b1) and b2) but also components b3) and b4).

The composition B preferably comprises at least one molybdenum compound, more preferably heptamolybdate, as additional component b5), which in no way adversely affects the stability of the composition B. In this case the concentration of the at least one molybdenum compound is preferably in the range from 10 to 100 mg/l (calculated as molybdenum).

The addition of such a molybdenum compound has proven advantageous especially where the composition B is employed as an afterrinse.

According to a first particularly preferred embodiment, the composition B comprises not only components b1) and b2) but also components b3) and b5).

According to a second particularly preferred embodiment, the composition B comprises not only components b1) and b2) but also components b4) and b5).

According to an especially preferred embodiment, the composition B comprises not only components b1) and b2) but also components b3), b4) and b5).

ii) Composition A:

The composition A preferably comprises at least one complex fluoride selected from the group consisting of the complex fluorides of titanium, zirconium and hafnium as component a1).

Further preference is given here to zirconium complex fluoride. Here, zirconium can also be added as zirconyl nitrate, zirconium carbonate, zirconyl acetate or zirconium nitrate, preferably as zirconyl nitrate. This applies analogously in the case of titanium and hafnium.

The content of the at least one complex fluoride is preferably in the range from 0.05 to 4 g/l, more preferably from 0.1 to 1.5 g/l and particularly preferably about 0.25 g/l (calculated as hexafluorozirconic acid).

In a preferred embodiment, the composition A comprises at least two different complex fluorides, in particular complex fluorides of two different metal cations and particularly preferably complex fluorides of titanium and of zirconium, as component a1).

In the composition A, the concentration of a1) is preferably in the range from 0.05 to 4 g/l, more preferably from 0.1 to 1.5 g/l, more preferably from 0.15 to 0.57 g/l, particularly preferably from 0.20 to 0.40 g/l and very particularly preferably about 0.25 g/l (calculated as hexafluorozirconic acid).

The contents of the components a1) and optionally of the components a2) and a3) (see below) can be monitored by means of ICP-OES (optical emissions spectrometry with inductively coupled plasma) or to an approximation photometrically during the treatment of the metallic surfaces, so that introduction of further amounts of individual components or a plurality of components can be carried out if necessary.

The composition A preferably additionally comprises a2) at least one compound selected from the group consisting of organoalkoxysilanes, organosilanols, polyorganosilanols, organosiloxanes and polyorganosiloxanes.

With regard to the at least one compound of the component a2) in the composition A, the prefix "organo" refers to at least one organic group which is bound directly via a carbon atom to a silicon atom and consequently cannot be split off from the latter hydrolytically.

For the purposes of the present invention, "polyorganosiloxanes" are compounds which can be condensed from at least two organosilanols and do not form polydimethylsiloxane.

The composition A preferably comprises at least one organoalkoxysilane, organosilanol, polyorganosilanol, organosiloxane and/or polyorganosiloxane having in each case at least one amino group, urea group, imido group, imino group and/or ureido group per organoalkoxysilane/organosilanol unit as component a2). Further preference is given to the component a1) being at least one organoalkoxysilane, organosilanol, polyorganosilanol, organosiloxane and/or polyorganosiloxane having in each case at least one, in particular one or two, amino group(s) per organoalkoxysilane/organosilanol unit.

Particular preference is given to 2-aminoethyl-3-aminopropyltrimethoxysilane, 2-aminoethyl-3-aminopropyltriethoxysilane, bis(trimethoxysilylpropyl)amine or bis(triethoxysilylpropyl)amine or a combination of these as organoalkoxysilane/organosilanol unit. Very particular preference is given to 2-aminoethyl-3-aminopropyltrimethoxysilane or bis(trimethoxysilylpropyl)amine or a combination of the two as organoalkoxysilane/organosilanol unit.

In the composition A, the concentration of a2) is preferably in the range from 1 to 200 mg/l, more preferably from 5 to 100 mg/l, particularly preferably from 20 to 50 mg/l and very particularly preferably from 25 to 45 mg/l (calculated as silicon).

Advantageously, the composition A additionally comprises a component a3) which is at least one type of cation selected from the group consisting of cations of metals of transition groups 1 to 3 and 5 to 8 including lanthanides and also of main group 2 of the Periodic Table of the Elements and also of lithium, of bismuth and of tin and/or is at least one corresponding compound.

The component a3) is preferably at least one type of cation selected from the group consisting of the cations of cerium and further lanthanides, chromium, iron, calcium, cobalt, copper, magnesium, manganese, molybdenum, nickel, niobium, tantalum, yttrium, vanadium, lithium, bismuth, zinc and tin and/or at least one corresponding compound.

The composition A more preferably comprises zinc cations, copper cations and/or cerium cations and/or at least one molybdenum compound as component a3).

The composition A particularly preferably comprises zinc cations, very particularly preferably zinc cations and copper cations, as component a3).

The concentrations in the composition A are preferably as follows:
zinc cations: from 0.1 to 5 g/l
copper cations: from 5 to 50 g/l
cerium cations: from 5 to 50 mg/l
molybdenum compound: from 10 to 100 mg/l (calculated as molybdenum).

According to a particularly preferred embodiment, the composition A comprises not only component a1) but also components a2) and a3).

The composition A optionally comprises, depending on specific requirements and circumstances, an additional component a4). This is at least one compound selected from the group consisting of substances which influence the pH, organic solvents, water-soluble fluorine compounds and colloids.

The composition A here preferably has a content of the component a4) in the range from 0.1 to 20 g/l.

The substances which influence the pH are preferably selected from the group consisting of nitric acid, sulfuric acid, acetic acid, methanesulfonic acid, hydrofluoric acid, ammonium/ammonia, sodium carbonate and sodium hydroxide. Further preference is given here to setting the pH with nitric acid, ammonium and/or sodium carbonate.

The composition A preferably has a pH in the range from 0.5 to 5.5, more preferably from 2 to 5.5, particularly preferably from 3.5 to 5.3 and very particularly preferably from 4.0 to 5.0.

The organic solvents are preferably selected from the group consisting of methanol and ethanol. In practice, methanol and/or ethanol are present as reaction products of the organoalkoxysilane hydrolysis in the treatment baths.

The water-soluble fluorine compounds are preferably selected from the group consisting of fluoride-comprising compound and fluoride anions.

The content of free fluoride in the composition A is preferably in the range from 0.015 to 0.15 g/l, more preferably from 0.025 to 0.1 g/l and particularly preferably in the range from 0.03 to 0.05 g/l.

The colloids are preferably metal oxide particles, more preferably metal oxide particles selected from the group consisting of $ZnO$, $SiO_2$, $CeO_2$, $ZrO_2$ and $TiO_2$.

The composition A preferably additionally comprises at least one type of cations selected from the group consisting of alkali metal ions, ammonium ions and corresponding compounds. It particularly preferably comprises sodium ions and/or ammonium ions.

The composition A can also comprise phosphorus- and oxygen-comprising compounds such as phosphates and/or phosphonates. In addition, it can comprise nitrate.

However, the content of sulfur-comprising compounds, in particular sulfate, should preferably be kept as small as possible. The content of sulfur-comprising compounds is particularly preferably below 100 mg/l (calculated as sulfur).

The metallic surface to be treated, which has optionally been cleaned and/or pickled beforehand, can in each case be sprayed with, dipped into or flooded with the composition A and/or with the composition B. It is also possible to apply the respective composition manually by wiping or brushing or by means of rolls or rollers (coil coating process) to the metallic surface to be treated. In addition, electrolytic deposition of the respective composition on the metallic surface to be treated is possible.

The treatment time in the treatment of parts is preferably in the range from 15 seconds to 20 minutes, more preferably from 30 seconds to 10 minutes and particularly preferably in the range from 45 seconds to 5 minutes. The treatment temperature is preferably in the range from 5 to 50° C., more preferably from 15 to 40° C. and particularly preferably in the range from 25 to 30° C.

The process of the invention is also suitable for the coating of strips (coils). The treatment time is in this case preferably in the range from a few seconds to some minutes, for instance in the range from 1 to 1000 seconds.

The process of the invention enables a mix of various metallic materials to be coated in the same bath (known as multimetal capability).

The metallic surface to be treated preferably comprises steel, galvanized steel, magnesium and/or a zinc-magnesium alloy; it more preferably comprises steel and/or galvanized steel; it particularly preferably comprises galvanized steel.

In the case of metallic surfaces comprising galvanized steel, in particular, greatly improved corrosion protection after cathodic electrophoretic coating (CEC) was observed after coating by means of the process of the invention.

This is manifested, for example, in comparison to treatment by a process which differs from the process according to the invention only in that it uses a polyacrylate and not a combination of at least one (meth)acrylate resin b1) and at least one phenol resin b2) in the composition B.

The present invention also provides an aqueous composition B for improving the anticorrosion pretreatment of a metallic surface comprising steel, galvanized steel, aluminum, an aluminum alloy, magnesium and/or a zinc-magnesium alloy, as described above.

In addition, the invention provides a concentrate from which a composition B according to the invention can be produced by dilution with water and optionally setting of the pH.

The treatment bath comprising the composition B of the invention can be obtained by dilution of the concentrate with water and/or an aqueous solution, preferably by a factor of from 1:50 000 to 1:10, more preferably from 1:10 000 to 1:10, particularly preferably from 1:8000 to 1:10 and very particularly preferably by a factor of about 1:5000.

In addition, the present invention provides a metallic surface which comprises steel, galvanized steel, magnesium and/or a zinc-magnesium alloy and has been coated by means of the process of the invention, wherein the coating formed has a layer weight determined by means of XRF (X-ray fluorescence analysis) of:
 i) from 5 to 500 mg/m², preferably from 10 to 200 and particularly preferably from 30 to 120 mg/m², based only on component a1) (calculated as zirconium) and optionally
 ii) from 0.5 to 50 mg/m², preferably from 1 to 30 and particularly preferably from 2 to 10 mg/m², based only on component a2) (calculated as silicon).

The coatings produced by the process of the invention serve as corrosion protection and also as bonding agents for further coatings.

Thus, they can easily be coated further with at least one primer, paint, varnish, adhesive and/or paintlike organic composition. Here, at least one of these further coatings can preferably be cured by heating and/or irradiation.

The coatings produced by the process of the invention are preferably rinsed in order to remove excess polymer and interfering ions from the metallic surface before further treatment. The first further coating can be applied by the wet-on-wet process.

As paint/varnish, preference is given to applying a cathodic electrophoretic coating (CEC) based on epoxides and/or (meth)acrylates.

Finally, the present invention also provides for the use of a metallic substrate which has been coated by the process of the invention in the automobile industry, for rail vehicles, in the aerospace industry, in apparatus construction, in mechanical engineering, in the building industry, in the furniture industry, for the production of crash barriers, lamps, profiles, cladding or small parts, for the production of bodywork or bodywork parts, of individual components, preinstalled or joined elements, preferably in the automobile or aviation industry, for the production of apparatuses or plants, in particular of domestic appliances, control devices, testing devices or construction elements.

Preference is given to using the coated metallic substrates for the production of bodywork or bodywork parts, of individual components and of preinstalled or joined elements in the automobile industry.

The present invention will be illustrated by the following examples, which are not to be interpreted as constituting a restriction.

EXAMPLES i) Substrates and Pretreatments:
Substrates:
 Sheets (10.5×19 cm) made of hot-dip galvanized steel (HDG) and others made of cold-rolled steel (CRS) were used as substrates.

Cleaning:

In all examples, Gardoclean® S 5176 (from Chemetall; contains phosphate, borate and surfactant) was used as mild-alkaline dipping cleaner. For this purpose, 15 g/l were made up in a 50 l bath, heated to 60° C. and the substrates were cleaned by spraying for 3 minutes at a pH in the range from 10.0 to 11.0. The substrates were subsequently rinsed with mains water and deionized water.

Prerinse (According to the Invention):

The prerinse was carried out using deionized water to which different amounts of a resin mixture (cf. Tab. 1: "Resin mix.") had optionally be added according to the invention. This resin mixture contained the following resole (exemplary formula) with a mass-average molecular weight of 160 g/mol

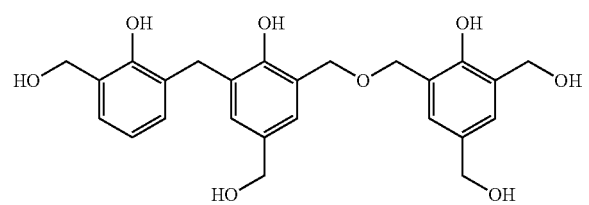 [SMILES: OCc1cc(CO)c(O)c(COCc2cc(CO)cc(Cc3cccc(CO)c3O)c2O)c1]

and a (meth)acrylate resin with a mass-average molecular weight of 9630 g/mol (determined by means of GPC), which had been polymerized from 90 mol % methyl methacrylate and 10 mol % acrylic acid, in a weight ratio of 1:3.7.

Added optionally as well to the prerinse according to the invention was a mixture of corrosion inhibitors (cf. Tab. 1: "Corr. inh."), so that the prerinse contained 62.5 mg/l of but-2-yne-1,4-diol and 50 mg/l of 1,4-bis(2-hydroxyethoxy)-2-butyne, giving a total of 112.5 mg/l of corrosion inhibitors.

TABLE 1

| Prerinse | Resin mix. (mg/l)* | Corr. inh. (mg/l) |
|---|---|---|
| A | 0 | 0 |
| B | 50 | 0 |
| C | 200 | 0 |
| D | 50 | 112.5 |

*Solids content

The prerinse of the substrates was carried out for 120 seconds at 20° C. with moderate stirring.

Conversion Bath (According to the Invention):

For the conversion bath, the Oxsilan® additive 9936 (from Chemetall, Germany; contains fluoride and a zirconium compound) and optionally Oxsilan® 9810/3 (from Chemetall, Germany; contains aminosilanes, cf. Tab. 3: "Silane") was or were added to a 50 l batch in such an amount that a zirconium concentration of 100-130 mg/l and a silane concentration of 20-30 mg/l (calculated as Si) resulted. The bath temperature was set to 30° C. The pH and the free fluoride content were set to pH=4.8 and 30-40 mg/l, respectively, by addition of dilute sodium hydrogencarbonate solution and dilute hydrofluoric acid (5% strength).

The pH was corrected continuously by addition of dilute nitric acid.

Added to the bath optionally according to the invention were various amounts of the resin mixture already described in connection with the prerinse according to the invention (cf. Tab. 3: "Resin mix.").

Additionally added to the conversion bath according to the invention were various amounts of the specific triblock copolymer $PEO_8$—$PPO_{50}$-$PEO_8$ (Pluronic® PE 9200; from BASF, Germany, cf. Tab. 3: "Stabil.").

The bath (according to the invention) always also contained 400 mg/l of zinc. Added optionally to the bath (according to the invention) were 8-10 mg/l of copper in the form of copper nitrate.

Before substrates were passed through, the finished bath was left to age for at least 12 hours in order to be able to ensure establishment of a chemical equilibrium within the bath. The conversion treatment was carried out for 120 seconds with moderate stirring. Rinsing with mains water and deionized water was subsequently carried out.

Afterrinse According to the Invention:

For the afterrinse, deionized water was used to which optionally, according to the invention, various amounts of the resin mixture already described in connection with the prerinse according to the invention (cf. Tab. 2: "Resin mix.") and also, optionally, 100 mg/l of the specific triblock copolymer already described in connection with the conversion bath according to the invention (cf. Tab. 2: "Stabil.") were added.

Added optionally to the afterrinse were also 20 mg/l or 50 mg/l of molybdenum in the form of ammonium heptamolybdate.

TABLE 2

| Afterrinse | Resin mix. (mg/l)* | Stabil. (mg/l)* | Mo (mg/l) |
|---|---|---|---|
| A | 0 | 0 | 0 |
| B | 50 | 0 | 0 |
| C | 200 | 0 | 0 |
| D | 400 | 0 | 0 |
| E | 50 | 100 | 0 |
| F | 50 | 100 | 20 |
| G | 50 | 100 | 50 |

*Solids content

The substrates were afterrinsed with moderate stirring at 20° C. for 90 seconds.

The combination of the various prerinses, conversion baths and afterrinses produced the examples and comparative examples set out in Tab. 3 below:

TABLE 3

| (Comp.) Ex. | Subs. | Prerinse | Conversion bath | | | | | Afterrinse |
| | | | Zr (mg/l) | Si (mg/l)* | Cu (mg/l) | Resin mix. (mg/l)** | Stabil. (mg/l)** | |
|---|---|---|---|---|---|---|---|---|
| CE1 | HDG | A | 120 | 30 | 8 | 0 | 0 | A |
| E2 | HDG | A | 120 | 30 | 8 | 15 | 0 | A |
| E3 | HDG | A | 130 | 30 | 10 | 20 | 40 | A |
| E4 | HDG | A | 130 | 30 | 10 | 50 | 100 | A |
| E5 | HDG | A | 130 | 30 | 10 | 70 | 140 | A |

TABLE 3-continued

| (Comp.) Ex. | Subs. | Prerinse | Conversion bath | | | | | Afterrinse |
|---|---|---|---|---|---|---|---|---|
| | | | Zr (mg/l) | Si (mg/l)* | Cu (mg/l) | Resin mix. (mg/l)** | Stabil. (mg/l)** | |
| E6 | HDG | A | 130 | 30 | 10 | 50 | 100 | A |
| E7 | HDG | A | 130 | 30 | 10 | 100 | 200 | A |
| CE8 | CRS | A | 120 | 30 | 8 | 0 | 0 | A |
| E9 | CRS | A | 130 | 30 | 10 | 20 | 40 | A |
| E10 | CRS | A | 130 | 30 | 10 | 50 | 100 | A |
| E11 | HDG | A | 120 | 30 | 8 | 0 | 0 | B |
| E12 | HDG | A | 130 | 30 | 10 | 0 | 0 | B |
| E13 | HDG | A | 130 | 30 | 10 | 0 | 0 | D |
| E14 | HDG | A | 130 | 30 | 10 | 0 | 0 | B |
| E15 | HDG | A | 130 | 30 | 10 | 0 | 0 | C |
| E16 | HDG | A | 130 | 30 | 0 | 0 | 0 | C |
| E17 | CRS | A | 130 | 0 | 0 | 0 | 0 | C |
| E18 | CRS | A | 130 | 30 | 0 | 0 | 0 | C |
| E19 | CRS | C | 130 | 30 | 10 | 0 | 0 | A |
| E20 | HDG | B | 130 | 30 | 10 | 0 | 0 | A |
| E21 | HDG | C | 130 | 30 | 10 | 0 | 0 | A |
| E22 | HDG | D | 130 | 30 | 10 | 0 | 0 | A |
| E23 | HDG | A | 120 | 30 | 8 | 30 | 0 | A |
| E24 | CRS | A | 130 | 30 | 10 | 100 | 200 | A |
| E25 | HDG | A | 120 | 30 | 8 | 27.5 | 0 | A |
| E26 | CRS | A | 120 | 30 | 8 | 27.5 | 0 | A |
| CE27 | HDG | A | 100 | 30 | 8 | 0 | 0 | A |
| E28 | HDG | A | 100 | 30 | 8 | 0 | 0 | E |
| E29 | HDG | A | 100 | 30 | 8 | 0 | 0 | F |
| E30 | HDG | A | 100 | 30 | 8 | 0 | 0 | G |

*Calculated as Si;
**Solids content ii) Analysis, Coating, Bond Strength and Corrosion Protection:

X-Ray Fluorescence Analysis:

The layer weights (LW) in mg/m² on the pretreated substrates were determined by means of X-ray fluorescence analysis (XRF). Here, the amount of zirconium applied was measured.

Surface Coating:

The pretreated substrates were coated by CEC. Cathoguard® 800 (from BASF Germany) was used for this purpose. A buildup coating was subsequently applied. This was Daimler Black. The thickness of the coating layer was determined by means of a layer thickness measuring instrument in accordance with DIN EN ISO 2808 (2007 version). It was in the range from 90 to 110 μm.

Corrosion Tests:

In addition, four different corrosion tests were carried out:

1.) the corrosion cycle test according to Volkswagen specification PV 1210 (2010 February version) over 60 rounds, 2.) the corrosion cycle test according to VDA test sheet 621-415 and according to DIN EN ISO 20567-1 (1982 version method C) over 10 rounds, 3.) the corrosion cycle test Meko S test c in accordance with DIN EN ISO 4628-8 (2013 March version), and 4.) the cathodic polarization in accordance with FFM_C-AN_01941 (2.0 version)

Delamination:

The corrosive delamination in mm was in each case determined in accordance with DIN EN ISO 4628-8 (2012 version) (cf. Tab. 4: "Cd"). The values reported are average values from three sheets in each case.

The results of the corrosion tests carried out are summarized in Tab. 4 below:

TABLE 4

| (Comp.) Ex. | LW (Zr) (mg/m²) | VDA 621-415 Cd (mm) | PV 1210 Cd (mm) | Meko S Cd (mm) | Cath. Pol. Cd (mm) |
|---|---|---|---|---|---|
| CE1 | 94 | 2.3 | 3.0 | 5.8 | n.d. |
| E2 | 80 | 1.8 | 2.4 | n.d. | n.d. |
| E3 | 117 | 1 | n.d. | n.d. | n.d. |
| E4 | 119 | 0.8 | n.d. | n.d. | n.d. |
| E5 | 115 | 1 | n.d. | n.d. | n.d. |
| E6 | 62 | 0.8 | n.d. | n.d. | n.d. |
| E7 | 59 | 0.9 | n.d. | n.d. | n.d. |
| CE8 | 50 | 2.8 | 5.2 | 5.3 | n.d. |
| E9 | 51 | 1.6 | n.d. | n.d. | n.d. |
| E10 | 50 | 1.7 | n.d. | n.d. | n.d. |
| E11 | 90 | 1.8 | n.d. | 4.8 | n.d. |
| E12 | 125 | 1 | n.d. | n.d. | n.d. |
| E13 | 147 | 1.2 | n.d. | n.d. | n.d. |
| E14 | 69 | 0.8 | n.d. | n.d. | n.d. |
| E15 | 70 | 0.7 | n.d. | n.d. | n.d. |
| E16 | 46 | 0.8 | n.d. | n.d. | n.d. |
| E17 | 81 | 1.2 | n.d. | n.d. | n.d. |
| E18 | 53 | 1.0 | n.d. | n.d. | n.d. |
| E19 | 30 | 1 | n.d. | n.d. | n.d. |
| E20 | 66 | 1 | n.d. | n.d. | n.d. |
| E21 | 45 | 0.8 | n.d. | n.d. | n.d. |
| E22 | 60 | 0.8 | n.d. | n.d. | n.d. |
| E23 | 97 | n.d. | 2.4 | n.d. | n.d. |
| E24 | 27 | n.d. | 2.7 | n.d. | n.d. |
| E25 | 113 | n.d. | n.d. | 4.6 | n.d. |
| E26 | 48 | n.d. | n.d. | 4.9 | n.d. |
| CE27 | 86 | n.d. | n.d. | n.d. | 12.8 |
| E28 | 93 | n.d. | n.d. | n.d. | 11.5 |
| E29 | 74 | n.d. | n.d. | n.d. | 5.4 |
| E30 | 79 | n.d. | n.d. | n.d. | 3.9 | n.d. = not determined iii) Results and Discussion:

Tab. 4 shows that through addition of the resin mixture according to the invention, in the prerinse, in the conversion bath and in the afterrinse, a reduction can be ascertained in the corrosive delamination (cf. values of the examples versus those of the comparative examples CE1, CE8 and CE27).

Through the addition of silane there is again an improvement (cf. E18 versus E17). The addition of copper results in an increase in the layer weight (cf. E15 and E16).

Though the addition of the specific triblock copolymer, a distinct increase was posted (results not shown) in the useful life of the conversion bath comprising the resin mixture according to the invention. Agglomeration of the resin in the acidic environment was very largely prevented (E3 to E7 versus E2; E9 and E10).

The addition of the corrosion inhibitor to the prerinse according to the invention likewise resulted in a further improvement (cf. E22 versus E20), as did the addition of molybdenum to the afterrinse according to the invention (cf. E29, E30 versus E29).

The invention claimed is:

1. A process for anticorrosion pretreatment of a metallic surface comprising steel, galvanized steel, aluminum, an aluminum alloy, magnesium and/or a zinc-magnesium alloy, wherein the metallic surface is brought into contact with
   i) an acidic aqueous composition A which comprises a1) at least one compound selected from the group consisting of titanium, zirconium and hafnium compounds, and
   ii) an aqueous composition B which comprises b1) at least one (meth)acrylate resin and b2) at least one phenolic resin, wherein the concentration of the at least one (meth)acrylate resin b1) and the at least one phenolic resin b2) in total in the composition B is in the range of 20 to 400 mg/l (calculated as solid addition), wherein the aqueous composition B further comprises as a stabilizer b3) at least one triblock copolymer of a formula I:

$$PEOx\text{-}PPOy\text{-}PEOz \quad (I),$$

wherein x and z in each case are an integer in the range of 4 to 12 and y is an integer in the range of 35 to 65, wherein a mass concentration (calculated as solid addition) of the stabilizer b3) in the composition B is in the range of 1.5 to 2.5 times the total concentration of the at least one (meth)acrylate resin b1) and the at least one phenol resin b2),
   wherein the at least one (meth)acrylate resin b1) is a copolymer of a methacrylic ester and acrylic acid,
   wherein the metallic surface is brought into contact
      i) firstly with the composition A and then with the composition B,
      ii) firstly with the composition B and then with the composition A, and/or
      iii) simultaneously with the composition A and the composition B.

2. The process according to claim 1, wherein the metallic surface is brought into contact firstly with the composition A and then with the composition B.

3. The process according to claim 1, wherein the at least one (meth)acrylate resin b1) is a copolymer of a methyl methacrylate and acrylic acid.

4. The process according to claim 3, wherein the at least one (meth)acrylate resin b1) comprises 80 to 98% by weight of methyl methacrylate and 2 to 20% by weight of acrylic acid (total: 100% by weight).

5. The process according to claim 1, wherein the at least one (meth)acrylate resin b1) comprises hydroxyl, silyl, alkyl, aryl, heteroalkyl, heteroaryl, thio, amino, amide, nitrile, epoxy, mercapto, ureido, nitro, halo and/or cyano groups.

6. The process according to claim 1, wherein the at least one (meth)acrylate resin b1) has a mass-average molecular weight in the range of 1000 to 500 000 g/mol.

7. The process according to claim 1, wherein the at least one phenol resin b2) is a resole.

8. The process according to claim 1, wherein the at least one phenol resin b2) has a mass-average molecular weight in the range of 100 to 5000 g/mol.

9. The process according to claim 1, wherein the composition B comprises the at least one (meth)acrylate resin b1) and the at least one phenolic resin b2) in a weight ratio in the range of 1:1 to 10:1.

10. The process according to claim 1, wherein the composition B additionally comprises at least one compound b4) of a formula II:

$$R^1O\text{—}(CH_2)_x\text{—}Z\text{—}(CH_2)_y\text{—}OR^2 \quad (II),$$

where $R^1$ and $R^2$ in each case independently of one another are H or a group $HO\text{—}(CH_2)_w\text{—}$ with $w \geq 2$, x and y in each case independently of one another are 1 to 4, and Z is a sulfur atom or a C—C triple bond.

11. The process according to claim 1, wherein the composition B additionally comprises at least one molybdenum compound b5).

12. The process according to claim 1, wherein the at least one compound a1) in the composition A is at least one complex fluoride selected from the group consisting of the complex fluorides of titanium, zirconium and hafnium.

13. The process according to claim 1, wherein the composition A additionally comprises a2) at least one compound selected from the group consisting of organoalkoxysilanes, organosilanols, polyorganosilanols, organosiloxanes and polyorganosiloxanes.

14. The process according to claim 13, wherein the at least one compound a2) is at least one organoalkoxysilane, organosilanol, polyorganosilanol, organosiloxane and/or polyorganosiloxane having in each case at least one amino group, urea group, imido group, imino group and/or ureido group per organoalkoxysilane/organosilanol unit.

15. The process according to claim 1, wherein the composition A additionally comprises from 0.1 to 5 g/l of zinc cations, from 5 to 50 mg/l of copper cations and/or from 5 to 50 mg/l of cerium cations and/or from 10 to 100 mg/l of at least one molybdenum compound (calculated as molybdenum) as a component a3).

16. The process according to claim 1, wherein the metallic surface comprises steel and/or galvanized steel.

17. The process according to claim 1, wherein the metallic surface is brought into contact simultaneously with the composition A and the composition B.

18. An aqueous composition B for improving the anticorrosion pretreatment of a metallic surface comprising steel, galvanized steel, magnesium and/or a zinc-magnesium alloy according to claim 1.

19. A concentrate, wherein a composition B according to claim 18 can be produced therefrom by dilution with water.

20. A metallic surface comprising steel, galvanized steel, magnesium and/or a zinc-magnesium alloy, wherein the metallic surface has been coated by a process according to claim 1 and a coating formed has a layer weight determined by means of XRF of:
    i) from 5 to 500 mg/m² based only on the at least one compound a1) (calculated as zirconium) and optionally ii) from 0.5 to 50 mg/m² based only on the at least one compound a2) (calculated as silicon).

21. A method for using a metallic substrate which has been coated by a process according to claim 1, the method comprising utilizing the metallic substrate in the automobile industry, for rail vehicles, in the aerospace industry, in apparatus construction, in mechanical engineering, in the building industry, in the furniture industry, for the production of crash barriers, lamps, profiles, cladding or small parts, for the production of bodywork or bodywork parts, of individual components, preinstalled or joined elements, in the aviation industry, or for the production of apparatuses or plants.

\* \* \* \* \*